Sept. 12, 1950     A. E. RICE ET AL     2,521,948

CASTER

Filed Dec. 15, 1947                                  2 Sheets-Sheet 1

INVENTORS
A. E. Rice
BY A. F. Rice
Robbard Robb
Attorneys

Sept. 12, 1950   A. E. RICE ET AL   2,521,948
CASTER

Filed Dec. 15, 1947   2 Sheets-Sheet 2

INVENTOR.
A. E. Rice
BY A. F. Rice
Robbar Robb
Attorneys

Patented Sept. 12, 1950

2,521,948

UNITED STATES PATENT OFFICE 2,521,948

CASTER

Albert E. Rice and Adelbert F. Rice, Cleveland, Ohio

Application December 15, 1947, Serial No. 791,690

5 Claims. (Cl. 16—21)

This invention embodies certain novel improvements in casters of the anti-friction bearing type.

Among the objects of this invention are to provide a high strength structure for the frame or yoke member of the caster in connection with peculiarly formed anti-friction bearing race members united thereto; to provide a novel assemblage of said race members; to employ highly rigid connections between one of the race members and the frame in which the wheel is mounted, and to similarly make provisions for similar rigid connections intermediate other race parts and the caster stem or pintle, all conducive to affording a caster unit of the most sturdy character, capable of withstanding, without bending or distortion, the great amount of wear and tear incident to diversified conditions of service and use in many different fields.

Other detail features of novelty of the invention will be apparent on reference to the following detailed description, and the accompanying drawings, in which certain preferred forms of the invention are disclosed.

Figure 1:
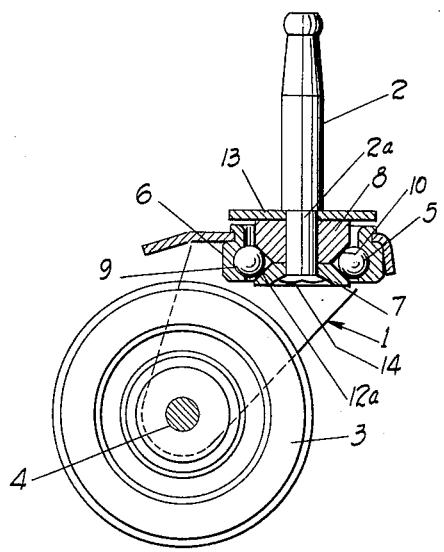
Figure 1 is a vertical sectional view taken through my caster structure about on the line 1—1 of Figure 3.
Figure 2:
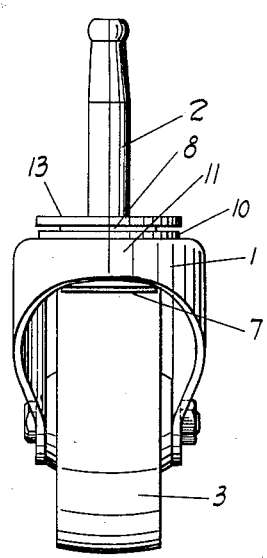
Figure 2 is a view of the caster in rear elevation.
Figure 3:
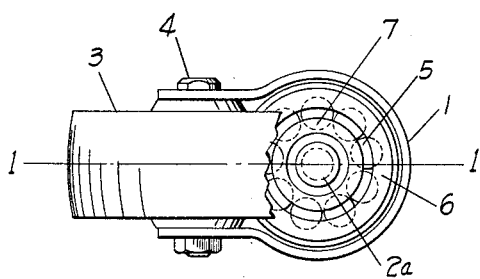
Figure 3 is a bottom plan view of the caster with the wheel thereof partially broken away in order to disclose more fully the bearing structure.

Referring to the adaptation of our invention as disclosed by Figures 1 to 3 of the drawings, it is noted that, as is customary, the caster comprises the usual three main members, including the frame or yoke 1, the pintle 2 forming the caster stem, and the roller or wheel 3 journaled on the shaft post 4 carried by the lower end of the frame 1 at the side portion of the latter.

The caster illustrated is designed to afford an anti-friction bearing construction, for which purpose there are provided the ball bearings 5 which are mounted between the outer race member 6, the lower inner race member 7, and the upper inner race member 8.

The outer race member 6 consists of a cylindrical body portion or ring formed on its inner side with the raceway 9 at the lower portion thereof. The body of the member 6 is reduced at its upper portion to provide a sleeve extension 10 which passes through an opening in the cross member 11 which connects the sides of the frame 1 similar to common practice. It is noted that the sleeve extension 10 on the outer race member 6, however, is flanged or swaged over the upper side of the cross part 11 of the frame 1, thereby to rigidly connect this race member with the portion 11 of the frame and rigidify the latter with a bracing effect at such middle portion.

As seen well in Figure 1, the upper inner race member 8 consists of a solid body which surrounds the lower reduced end portion 2a of the stem or pintle 2. At its lower end portion the member 8 is cut away in an annularly bevelled manner to provide the upper portion 12 of the inner raceway. Below the inner upper race member 8 is the inner lower race member 7 previously mentioned, the latter being annularly or circumferentially bevelled as at 12a to provide the lower portion of the inner raceway for the ball bearing 5. The lower inner race member 7 is of somewhat inverted cup-like form and its upper end is flapped to contact with the lower flapped ends of the member 8. The stem or pintle 2 passes through an opening in the lower inner race member 7 after the manner of its passing through the central opening of the race member 8. Above the race member 8 is located the guard plate or washer member 13 which overhangs the space between the sleeve extension 10 and the outer periphery of the body of the race member 8. The plate 13 has a central opening enabling it to be mounted also on the reduced end portion 2a of the stem 2.

The manner of assembling the parts, as seen in Figure 1 may now be set forth. It will be assumed that the outer race member has been assembled upon the frame 1 of the caster by having the reduced sleeve extension 10 passed through an opening in the cross member 11 of the frame 1, after which, by application of pressure of a suitable die or machine, the upper end of the portion 10 of the race member 8 will be swaged outwardly to overlie the part 11 of the frame and become rigidly connected therewith incidental to the pressure operation. Next the plate 13 will be emplaced on the reduced portion 2a of the stem 2, the upper race member 8 will be also applied to the part 2a so as to lie in contact with the member 13, and the balls 5 will be placed between the parts 6 and 8 prior to the positioning of the lower inner race member 7 on the end of the stem 2 at the reduced portion 2a of the latter. With the balls 5 and the race member 8 so disposed on the stem 2, the lower race member 7 will next be applied to the stem 2 at the free extremity of the portion 2a and thereupon the stem will be peened over at its end adjacent to the raceways as shown at 14, whereby to very tightly and rigidly connect the parts 7, 8, and 13 to the portion 2a of the stem. Under these conditions, of course, the balls 5 will be retained in the raceways provided by the members 7 and 8, and 6. Care will of course be exercised in the assembly operation not to clamp the balls 5 against movement in the raceways of the members 8, 7, and 6, but permit of free movement of said balls.

The structure thus assembled ready for use, it will be understood that the swivelling operation of the frame of the caster relatively to the stem 2 will be obtained incident to the immobility of the stem in the socket in which it is introduced and the free swivelling of rotative movement of the frame 1 moving with the outer race member 6 whilst the inner race members 7 and 8 and the plate 13 remain stationary with the stem 2.

Figure 4:
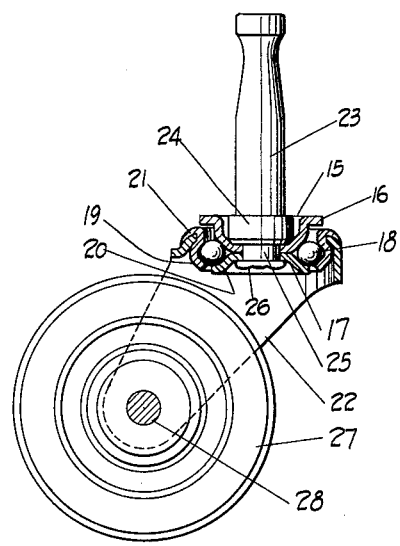
Figure 4 is a view similar to Figure 1 but illustrating a modification of my invention in which the bearing parts are largely made from stampings.

In Figure 4 of the drawings there is illustrated a modification of the invention in which the parts are very similar to those previously described but are made largely from metal stampings. In this modification, to all intents and purposes, the overlying plate 13 of the Figure 1 construction and the upper inner ball race member are practically made in one unit consisting of a cup-like stamping 15 having the upper outer flange 16 and the downwardly and inwardly contracted base portion 17, the outer inclined portion of which forms the upper inner race for the balls 18. In this construction the outer race member 19 and the lower inner race member 20 are preferably made each from a metal stamping, the member 20 being very similar in form to the member 7 shown in Figure 1, and the member 19, being the outer race member, being made of a metal stamping, is shaped to provide the outer raceway for the balls 18, and also shaped at its upper portion by suitable spreading action to overlie at 21 the adjacent cross portion of the frame 22. The upper portion of the ring-like body composing the outer race member 19 is swaged outwardly so as to overlie the opening in the cross member of the frame 22 in which it is mounted, as shown at 21, and by pressure the said portion 21, swaged outwardly, is pressed into clamping engagement with the adjacent portion of the cross member of the frame 22 at the opening through which the member 19 passes. In the above manner the outer race member 19 is united, practically speaking, to the cross portion of the frame 22 in substantially the same way as the member 6 of Figure 1 is united to the portion 11 of the frame 1 illustrated therein.

The general method of assemblage of the parts in Figure 4 is the same as in Figures 1 to 3 construction. In Figure 4, however, the pintle or stem 23 is formed with a head 24 spaced from its lower end, from which head extends a reduced portion 25 on which the race parts 15, 19, and 20 are assembled, the lower extremity of the reduced part 25 being peened over as at 26 in a manner corresponding to the portion 14 of Figure 1, and for the same purpose. Thus, the parts 15 and 20 are united to the stem 23 rigidly and the race member 19 is united to the frame 22 rigidly. The action of the caster is the same in the construction of Figure 4 as in the construction depicted in Figures 1 to 3 inclusive. In Figure 4 the wheel is designated 27 and its cross bolt shaft 28.

Figure 5:
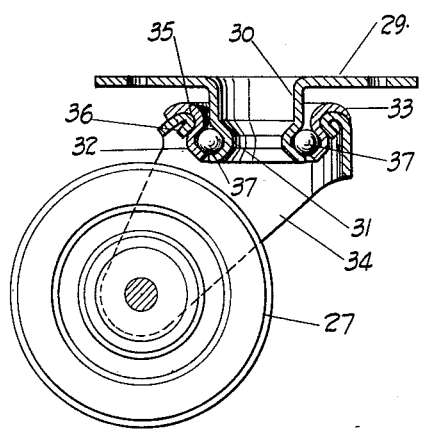
Figure 5 is a view similar to Figures 1 and 4, showing my caster construction as made from stampings and provided with an attachment plate in lieu of the stem or pintle, the caster being designed in this construction primarily for industrial or heavy duty usage.

Figure 5 illustrates the adaptation of my caster construction for industrial or heavy duty purposes. In this instance the pintle or stem is dispensed with and the attachment plate 29 is employed suitably apertured for passing therethrough of attachment screws or the like. In this construction stampings are used similarly to those in Figure 4, as shown, and as distinguished from the machined steel parts employed in the construction of Figures 1 to 3 for the raceways. At the central portion thereof the attachment plate 29, see Figure 5, is provided with a downwardly projecting cylindrical extension 30 of hollow form, the lower end portion of which is curved to provide the inner ball raceway 31, the hollow portion of which faces outwardly. In this construction the outer race 32 is made similarly to the race member 19 of Figure 4 in that it is rolled or spread at its upper outwardly curved flange portion 33 to overlie the cross member of the frame 34, said cross member being designated 35. In this construction, however, the cross member of the frame 34 is rolled at the opening through which the raceways extend in a downward manner to provide the downward flange 36 which reinforces or strengthens the cross member of the frame 34 at the open portion through which the raceways are mounted. In this instance the inner raceway is a single unit as distinguished from the double unit form in Figures 1 and 4, and the balls 37 are mounted between the inner race member 31 and the outer race member 32 in the customary way. The manner of crimping the upper portion of the race member 32 over the frame cross part as in Figure 5 and as in Figure 4 achieves the function of reinforcing the frame in the same manner as achieved in the Figure 1 construction, and, additionally, in regard to the Figure 5 construction, the rolling of the upper portion of the frame 34 inwardly at the opening receiving the outer race member 32 renders this part of the frame mutually reinforcing in respect to the portion 32 or race member aforesaid. According to the Figure 5 construction, the crimping or swaging of the upper portion of the race member 32 as at 33 will be the last operation performed after assembling the ball bearings between the race members 31 and 32.

By the several types of construction of caster which are above described, and which are illustrated in the drawings, it will be perceived that the objectives initially specified herein are achieved. Obviously, the pintles or stems 2 and 23, and the member 29, are all attachment members.

The race member 6 not only reinforces the frame or fork 1 at the opening through which the race passes, but is hung from the cross portion of the frame and the body of the member 6 fits closely to the surrounding walls of the frame and affords reinforcing rigidity at such walls as seen on reference to Figures 1 and 4, the frame sides projecting downwardly outward of the race member 6. It is important that the level of the anti-friction balls is below the cross portion of the frame. The reinforcing in the structure of Figure 5 is through the in-rolled flange 35. The strength of the whole caster race and frame assembly is thus greatly enhanced.

Having thus described our invention, what we claim as new and desire to secure by Letters Patent of the United States, is:

1. In a caster, in combination, an attachment member, inner race means carried thereby; a frame comprising sides and a cross portion connecting the sides, the cross portion having an opening through which the inner race member upwardly projects, outer race means including an outer race member having its upper portion passing snugly through said opening and offset outwardly above its race portion to engage over the cross portion at the opening to reinforce the latter, the sides of the frame engaging closely the outer side of the outer race member and projecting downwardly outward of the outer race, and anti-friction bearings between said race members below the cross portion of the frame.

2. A caster as claimed in claim 1, in which the frame at the periphery of said opening is curved on itself to provide a rolled edge to engage and reinforce the outer race member.

3. A caster as claimed in claim 1, in which the frame at the periphery of said opening is curved on itself in a direction inwardly and downwardly to engage and reinforce the outer race member.

4. A caster as claimed in claim 1, in which the attachment member is formed with a downwardly projecting hollow extension inside the outer race member, said extension being formed with race means providing the inner race for the bearings.

5. In a caster, in combination, a stem, a roller supporting frame comprising an upper cross portion and downwardly extending sides, a roller journaled in said sides, an inner race member, the frame cross portion having an opening vertically therethrough through which the lower portion of the inner race member passes downwardly to a point so that its race is below the cross portion, an outer race member passing snugly through said opening and having its upper end interlockingly hung from the cross portion at such opening, and the walls of the frame below the said opening closely surrounding and engaging the outer side portion of the outer race, the upper end of the outer race being out-turned over the frame cross portion at the opening of the latter to establish said interlocking connection, the races of both race members being located below the cross portion of the frame, and ball bearings between the race members.

ALBERT E. RICE.
ADELBERT F. RICE.

REFERENCES CITED

The following references are of record in the file of this patent:

UNITED STATES PATENTS

| Number | Name | Date |
| --- | --- | --- |
| 672,566 | Neuberth et al. | Apr. 23, 1901 |
| 1,913,056 | Kilian | June 6, 1933 |
| 1,923,211 | Jarvis | Aug. 22, 1933 |
| 2,140,403 | Johnson | Dec. 13, 1938 |